3,253,038
REDUCTION OF NITRO COMPOUNDS IN THE PRESENCE OF A CRYSTALLINE ALUMINOSILICATE ZEOLITE CATALYST
John J. Wise, Arlington, Mass., assignor to Socony Mobil Oil Company, Inc., a corporation of New York
No Drawing. Filed Feb. 21, 1963, Ser. No. 260,288
17 Claims. (Cl. 260—580)

This invention relates to the reduction of nitro substituted organic compounds in the presence of an aluminosilicate having unique catalytic activity and more particularly to the reduction of nitroaromatic compounds in the presence of such aluminosilcate catalysts.

Both naturally occurring and synethetic crystalline aluminosilicates have been found to exhibit catalytic activity in the conversion of organic compounds. These aluminosilicates, known broadly as zeolites, have ordered internal structures which form internal passages, pores, or cavities of definite ranges of size. Because the dimensions of these pores serve to accept for adsorption, molecules of certain dimensions and reject those of larger dimension, these materials have been referred to as "molecular sieves" and are utilized so that advantage may be taken of these properties.

This invention contemplates the production of amino compounds by reduction of corresponding nitro compounds and their intermediate products of reduction with a reducing agent of hydrogen sulfide in the presence of a catalyst prepared from crystalline aluminosilicates having exchangeable metal cations within their ordered internal structure. These metal cations form active sites within the aluminosilicate catalyst, which produce high catalytic activity under reduction conditions.

In accordance with this invention, it has been found that the use of aluminosilicate catalysts having metallic cations capable of effecting reduction reactions ionically bonded or chemisorbed within their ordered internal structures produce high yields of compounds having the amino group as a characterizing group and particularly aromatic amines such as aniline at low temperatures and at substantially atmospheric pressure in both vapor and mixed vapor-liquid phases. These metallic cations are present within the ordered internal structure of the aluminosilicate as the result of base exchanging the cations within an existing aluminosilicate, incorporating the cations during the formation of a synethetic aluminosilicate or as the exchangeable cations usually found within a naturally occuring aluminosilicate. Particularly effective are the cations of metals such as the alkali metals and the alkaline earth metals which will form sulfur complexes (polysulfides) with the sulfur atoms present in the hydrogen sulfide reducing agent. Of these metals, sodium is accorded preference because of its frequent presence within both synethetic and naturally occurring aluminosilicates.

It will be appreciated that other metal cations having activity for promoting reduction of nitro substituted organic compounds may be exchanged within the synthetic or naturally occurring aluminosilicates to also produce catalysts which will effect the production of corresponding amino compounds.

Under the operating conditions of the present process, a gaseous reducing medium comprising hydrogen sulfide is employed. This gas is particularly effective for the present reduction reactions because of the ease with which its sulfide ion shares electrons with other elements at low temperatures, and because of its action upon a number of metals whereby hydrogen is displaced by the metallic substances and a sulfur complex (polysulfide) is formed. Thus, under the reaction conditions of this process it is believed without intending to be limited by any theory that the hydrogen sulfide forms polysulfide complexes with the exchangeable metal cations such as the alkali metals that are present at the active sites within the ordered internal structure of the aluminosilicate catalyst. It is postulated that the formation of these complexes produces active hydrogen within the internal structure of the catalyst which serves to effect reduction of the characterizing nitro group.

Exemplary of the nitro-substituted organic compounds which may be aminated by the process of this invention are the nitro-substituted derivatives of the aromatics of the benzene, naphthalene, anthracene and like series, and homologs thereof. Other representative compounds include nitrophenol, nitroanisole, paranitroalkyl benzenes and metanitroalkyl benzenes. Polynitro compounds likewise may undergo reduction with one or more of the nitro groups being converted to amino groups. Thus, ortho, meta and para dinitrobenzenes are converted to nitroanilines and finally to phenylenediamines. In addition, other groups which are intermediate products of reduction of the nitro group may be attached to the nuclei of such compounds. Representative of some of these intermediate groups are nitroso, azo, hydroxyamino, azoxy, hydrazo, and the like. Nitro aliphatic compounds are also reduced by hydrogen sulfide over these catalysts. Illustrative of aliphatic nitro compounds capable of reduction in accordance with the present process are the nitroparaffins such as 1-nitropropane, 2-nitropropane; aliphatic nitro acids such as 2-nitro-4-pentanoic acid.

Advantageously, the temperature generally employed in the present reduction process extend from about 100° C. to about 500° C. Generally, the lower temperature limit for the process is determined by the temperature required to initiate the reduction reactions as well as that necessary to maintain at least one of the reactants in the vapor phase. Because the process usually operates at atmospheric pressure, the initiating temperature is controlling. However, at higher pressures it is desirable to operate at a temperature above that required to vaporize the least volatile gas. For example, the critical temperature of hydrogen sulfide is 100.4° C.

The degradation temperatures of either the reactants or reaction products generally govern the upper operating temperatures. In addition, it will be appreciated that the upper operating temperatures of the process are selected to avoid reduction in the activity of the aluminosilicate catalyst caused by collapse of its crystalline structure.

The pressures under which the reduction reactions of this process are carried out may extend from atmospheric to several atmospheres. Preferably the process is operated at atmospheric pressure because vapor phase operation is desired and the costs for such operation are substantially less than that required for high pressures. In addition, at low pressures the formation of liquids within the reaction zone, either from the reactants or from the resulting products, is eliminated; thereby facilitating separation of the desired amines by simple fractional distillation. It will be appreciated that the choice of pressure is dependent on the phase relationship required to produce a desired distribution of reaction products in the presence of a particular aluminosilicate catalyst.

The relative molar ratio of reactants required for the present process may be varied over a wide range. In general, the reducing agent, i.e. hydrogen sulfide, is used in excess. Thus, in the reduction of nitrobenzene with hydrogen sulfide to form aniline, the preferred molar ratio between hydrogen sulfide and nitrobenzene is about 3 to 1. However, it will be understood that the reactants may be used in stoichiometric proportions.

Typical of the catalysts employed in accordance with the invention are aluminosilicates, both natural and synthetic, which have an ordered internal structure and uniform pore dimensions of at least about 5 Angstroms and generally in the approximate range of 5 to 15 Angstroms. These aluminosilicates can be described as a three dimensional framework of $SiO_4$ and $AlO_4$ tetrahedra in which the tetrahedra are cross linked by the sharing of oxygen atoms whereby the ratio of the total aluminum and silicon atoms to oxygen atoms is 1:2. In their hydrated form, the aluminosilicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any or more of a number of metal ions depending on whether the aluminosilicate is synthesized or occurs naturally. Typical cations include sodium, lithium, potassium and calcium. Other cations which can be introduced by base exchange of the initially formed aluminosilicate include copper, nickel, zinc, cobalt, platinum, and rare earth metals. Although the proportions of inorganic oxides in the silicates and their spatial arrangement may vary, effecting distinct properties in the aluminosilicates, the two main characteristics of these materials are the presence in their molecular structure of at least 0.5 equivalent of an ion of positive valence per gram atom of aluminum, and an ability to undergo dehydration without substantially effecting the $SiO_4$ and $AlO_4$ framework. It will be understood that the aluminosilicates contemplated as catalysts for this invention are generally or preferably crystalline aluminosilicates.

One of the crystalline aluminosilicates utilized by the present invention is the synthetic zeolite designated as zeolite X, and is represented in terms of mole ratios of oxides as follows:

$$1.0\pm0.2M_{2/n}O:Al_2O_3:2.5\pm0.5SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

Zeolite X is commercially available in both the sodium and the calcium forms; the former being preferred for the purposes of this invention. It will be appreciated that the crystalline structure of zeolite X is different from most zeolites in that it can adsorb molecules with molecular diameters up to about 10 A.; such molecules including branched chain hydrocarbons, aromatic and other cyclic compounds, and some alkylated cyclic compounds.

Other aluminosilicates are contemplated as also being effective catalytic materials for the invention. Of these other aluminosilicates, a synthetic zeolite, having the same crystalline structure as zeolite X and designed as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9\pm0.2Na_2O:Al_2O_3:wSiO_2:xH_2O$$

wherein "$w$" is a value greater than 3 up to about 6 and "$x$" may be a value up to about 9.

The selectivity of zeolite Y for larger molecules is appreciably the same as zeolite X since it possesses substantially the same pore size.

Another aluminosilicate material found to be active in the present reduction process is a naturally occurring zeolite known as mordenite. This zeolite is an ordered crystalline structure having a ratio of silicon atoms to aluminum atoms of about 5 to 1. In its natural state it usually appears as the sodium salt which is represented by the following formula:

$$Na_8(AlO_2)_8(SiO_2)_{40}\cdot 24H_2O$$

Mordenite differs from other known zeolites in that its ordered crystalline structure is made up of chains of 5-membered rings of tetrahedra and its absorbability suggests a parallel system of channels having free diameters on the order of 4 A. to 6.6 A., interconnected by smaller channels, parallel to another axis, on the order of 2.8 A. free diameters. As a result of this different crystalline framework, mordenite can adsorb simple cyclic hydrocarbons, but cannot accept the large molecules which will be adsorbed by zeolite X and zeolite Y. As a consequence of this smaller pore size it has been found that mordenite will be more rapidly deactivated than either zeolite X or zeolite Y at the operating conditions of the present process.

It will be appreciated that other aluminosilicates can be employed as catalysts in the present reduction process. Exemplary of the naturally occurring zeolites which may be used are: faujasite, heulandite, clinoptilolite, chabazite, gmelinite and dachiardite. These materials are known to have pore sizes which will absorb hydrocarbons containing three or more carbon atoms.

A criterion for the aluminosilicate to be employed as a catalyst is that its ordered internal structure should have defined pore sizes of sufficient diameters, after being exchanged with cations as heretofore described, to allow entry of the reactants and the formation of the desired amino compounds. In addition, the aluminosilicate catalyst should have an ordered internal structure capable of chemisorbing or ionically bonding any additional cations that will replace alkali metal or the like to increase its catalytic activity for the reduction reactions contemplated by this invention.

In accordance with this invention the sodium form of zeolite X having uniform pores of about 10 Angstrom units has been found to be a particularly effective catalyst for the process of aminating nitroaromatics by reduction of the nitro group with hydrogen sulfide. In addition, cations of other metals such as those in Groups I, II, III and VIII of the Perodic Table, capable of forming polysulfide complexes for the reasons heretofore presented, may be used to replace the sodium ions either partially or almost completely. Exemplary of some of these metals are iron, zinc, cobalt, nickel, cadmium, and the rare earths. These metals may be exchanged for the sodium as a result of a conventional treatment involving contacting the aluminosilicate with a fluid medium containing the replacing cations. Any medium which will ionize the cations without effecting the crystalline structure of the zeolite may be employed. After such treatment the resulting exchanged product is water washed, dried and dehydrated. This dehydration thereby producing characteristic system of open pores, passages, or cavities of crystalline aluminosilicates. As a result of this treatment, the aluminosilicate is a substantially crystalline catalyst in which the nuclear structure has been changed by having the metallic cations chemisorbed or ionically bonded thereto. It will be appreciated that other aluminosilicates, i.e. zeolite Y and mordenite, may be used in their sodium forms or may be exchanged in a similar manner with the above enumerated metals to serve as catalyst for effecting the desired reduction of nitro groups.

In accordance with this invention, the unique activity of the aluminosilicate catalyst is also affected by the availability of the active sites within its ordered internal structure. It will be appreciated that the pore sizes of the catalysts determine whether a compound of specific molecular dimensions can contact the active sites by passing through its ordered internal structure. Accordingly, catalysts having larger pore size effectively promote amination for a greater range of different organic compounds. In addition, the rate of deactivation of the catalyst, as exemplified by the longer life of zeolite X when compared with mordenite, is substantially affected by the pore size. Apparently, larger pore sizes allow the reactants to pass more freely through the ordered internal structure, thereby facilitating shorter contact times which prevent product degradation. Furthermore, larger pore sizes accommodate greater accumulation of tarry residues before becoming blocked and deactivated.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may feasibly be prepared as described in copending application of Albert B. Schwartz, Serial No. 147,722, filed October 26, 1961, by growing crystals of the aluminosilicate in the pores of the support. Also, the aluminosilicate may be intimately composited with a siutable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol, or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well known in the art, such as for example, hydrolysis of ethyl orthosilicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the process of this invention may be used in the form of small fragments of a size best suited for operation under the specific conditions existing. Thus, the catalyst may be in the form of a finely divided powder or may be in the form of pellets of $\frac{1}{16}''$ to $\frac{1}{8}''$ size, for example, obtained upon pelleting the aluminosilicate with a suitable binder such as clay. The zeolite, described hereinabove, may be obtained on a clay-free basis or in the form of pellets in which clay is present as a binder.

It will be appreciated that the operating conditions employed in the process of the present invention will be dependent on the specific reduction reaction being effected. Such conditions as temperature, pressure, space velocity and molar ratio of the reactants and the presence of inert diluents will have important effects on the process. Accordingly, the manner in which these conditions affect not only the conversion and distribution of the resulting amino products but also the rate of deactivation of the catalyst will be described below.

The process of this invention may be more readily understood by referring to the following example in which aniline was produced by reduction of nitrobenzene.

*Example*

In this example, the reaction was carried out in the vapor phase by passing hydrogen sulfide and nitrobenzene in a molar ratio of 3 to 1 through a continuous-flow glass reactor containing 17.2 ml. of a 13X molecular sieve catalyst. This catalyst is the sodium form of zeolite X having a pore size of about 10 A. and a particle size distribution of from 8 to 4 mesh. The reactor was wrapped with resistance wire and insulated with asbestos tape and aluminum foil to heat it, the temperature being controlled by varying the heat input through the resistance wires by means of a variable transformer. The reactor was maintained at atmospheric pressure. Nitrobenzene was fed by means of a syringe pump and hydrogen sulfide was metered from a lecture bottle into the reactor to provide the desired ratio of hydrogen sulfide to nitrobenzene. The liquid hourly space velocity of the nitrobenzene passing through the reactor was maintained at about 0.5.

The products exiting from the reactor were condensed in a water condenser and collected in a product receiver.

Samples of the condensed product at preselected time intervals were analyzed to determine the percent by weight of the aniline which was formed from the reduction of the nitrobenzene.

A first run was conducted, as set forth above, and the temperature in the reactor maintained at 200° C. At this temperature the nitrobenzene is in the liquid phase and therefore the reaction was carried out in mixed phase. Samples were taken at 68 and 98 minute intervals, condensed and analyzed. The temperature then was raised to 300° C. at which temperature the nitrobenzene was in the vapor phase, and samples were taken from the reactor at 113, 128 and 143 minute intervals, condensed and analyzed.

A second run was made at 300° C. using 4 mm. glass beads in the reactor in place of the sodium 13X molecular sieve catalyst. Samples were taken at 60 and 80 minute intervals and analyzed.

The results of these runs are shown in the following table:

| Catalyst | 8–4 Mesh 13X (Na+) Zeolite | | | | | 4 mm. Glass Beads | |
|---|---|---|---|---|---|---|---|
| Time on stream, min | 68 | 98 | 113 | 128 | 143 | 60 | 80 |
| Temperature, °C | 200 | 200 | 300 | 300 | 300 | 300 | 300 |
| Product composition from reactor, wt. percent: | | | | | | | |
| Lights ($H_2S+H_2O$) | 0.3 | 1.5 | 1.0 | 2.7 | 2.6 | 2.0 | 1.9 |
| Aniline | 3.1 | 4.8 | 8.8 | 14.8 | 15.7 | 7.1 | 6.8 |
| Nitrobenzene | 96.6 | 93.7 | 90.2 | 82.5 | 81.7 | 90.9 | 91.3 |
|  | 100.0 | 100.0 | 100.0 | 100.0 | 100.0 | 100.0 | 100.0 |

The above data show that the reduction of nitrobenzene with $H_2S$, when carried in a mixed phase, i.e. at 200° C. where the nitrobenzene is liquid, produces a lower yield of aniline, whereas when the reduction takes place in the vapor phase at 300° C. a much higher yield is produced. Also the data show the catalyst becomes more effective with time on stream. For example, at 113 minutes on stream, only 8.8% by weight of product composition was aniline but after 143 minutes on stream 15.7% by weight of the product produced was aniline. It is believed that this increase in aniline is the result of a build up of polysulfides within the pores of the catalyst thus producing a higher rate of reduction of the nitro group as nitrobenzene passes therethrough.

Another interesting feature is that in the vapor phase reaction the sodium 13X zeolite catalyst produced a much higher yield after longer periods of time on stream than when the reaction was conducted over glass beads in the same reactor and under the same conditions, thus showing the effectiveness of the catalyst of this invention in effecting reduction of a nitro group.

It will be appreciated that the reduction of a particular nitro group on aromatic ring compounds, where two or more nitro groups are present, can be selectively reduced by using the process of this invention. Thus, by controlling the operating conditions and selecting particular aluminosilicate catalysts as set forth in this invention, a nitro group in a specified position on the aromatic ring of those compounds containing two or more nitro groups can be selectively reduced by use of hydrogen sulfide. It will also be appreciated that the particular aluminosilicate catalyst used must have a pore size such that the aromatic ring compound containing two or more nitro groups will enter so that the selective reduction of the desired nitro group can be effected.

It will be appreciated that the above example is merely illustrative of the type of nitro substituted compound which may undergo reduction in accordance with the process of the invention and that other organic compounds containing nitro groups including aliphatic and aromatic compounds, for example those in the naphthalene and anthracene series, may undergo conversion to corresponding amino compounds utilizing the aluminosilicate catalysts of this invention.

It will be understood that the operating conditions for the reduction process of this invention can be varied so that the process can be conducted in a gaseous phase, a liquid phase, or mixed liquid-vapor phase, depending on the product distribution, the degree of amination, and the rate of catalyst deactivation.

It will also be appreciated that the foregoing description is merely illustrative of preferred embodiments of the invention, that various modifications and alteration may be made in the process without departing from the spirit of the invention and that the scope of the invention is limited only by the appended claims.

I claim:
1. A process for producing amino compounds by reduction of nitro substituted compounds which comprises effecting reaction of an organic compound selected from a group consisting of aliphatic and aromatic compounds containing at least one nitro group with hydrogen sulfide at a temperature in the approximate range of from 100° to 500° C. in the presence of a catalyst comprising a crystalline aluminosilicate zeolite having uniform pore dimensions of at least about 5 Angstrom units; said aromatic compound being selected from the group consisting of benzene, naphthalene, and anthracene and said aliphatic compounds being selected from the class of lower paraffinic compounds.

2. The process of claim 1 wherein said aluminosilicate zeolite is characterized by having exchangeable metal cations.

3. The process of claim 1 wherein said aluminosilicate zeolite is characterized by cations of metals which form polysulfide complexes.

4. The process of claim 1 wherein the catalyst is sodium zeolite X.

5. The process of claim 1 wheerin the catalyst is sodium zeolite Y.

6. The process of claim 1 wherein the catalyst is mordenite.

7. The process of claim 1 wherein said aluminosilicate zeolite contains cations of at least one metal selected from the group consisting of metals of the rare earth series and metals of Groups I, II, III and VIII of the Periodic Table.

8. The process of claim 1 wherein said aluminosilicate zeolite contains ionizable metals within an ordered internal structure selected from the group consisting of alkali metals and alkaline earth metals.

9. The process of claim 1 in which said reaction is conducted in the vapor phase.

10. The process of claim 1 in which said aluminosilicate zeolite is in finely divided form and contained in a porous matrix.

11. The process of claim 1 in which said aliphatic compounds are selected from the group consisting of paraffins and paraffinic organic acids.

12. A process for producing an amino benzene by reduction of a nitrobenzene which comprises effecting reaction of the latter with hydrogen sulfide in the presence of a catalyst comprising a crystalline aluminosilicate zeolite having uniform pore dimensions of at least about 5 Angstrom units at a temperature in the approximate range of from about 200° to about 500° C. and recovering the amino benzene from the reaction product.

13. The process of claim 12 wherein said amino benzene is aniline.

14. The process of claim 12 wherein the catalyst is sodium zeolite X.

15. The process of claim 12 wherein the reduction is conducted in the vapor phase.

16 The process of claim 12 wherein said aluminosilicate zeolite contains cations of at least one metal selected from the group consisting of metals of the rare earth series and metals of Groups I, II, III and VIII of the Periodic Table.

17. A process for producing amino compounds by reduction of nitro substituted aromatic compounds which comprises effecting reaction of an aromatic compound containing at least one nitro group and selected from the group consisting of benzene, naphthalene, and anthracene, with hydrogen sulfide at a temperature in the approximate range of from 100° to 500° C. in the presence of a catalyst comprising a crystalline aluminosilicate zeolite having uniform pore dimensions of at least about 5 Angstrom units.

References Cited by the Examiner

UNITED STATES PATENTS

| 1,845,280 | 2/1932 | Jaeger | 260—580 |
| 1,854,258 | 4/1932 | Herold et al. | 260—580 |
| 2,620,356 | 12/1952 | Munday | 260—580 |

CHARLES B. PARKER, *Primary Examiner.*